N. LANG.
AUTOMATIC TRAIN CONTROLLING MECHANISM.
APPLICATION FILED MAR. 16, 1909.
982,611.
Patented Jan. 24, 1911.
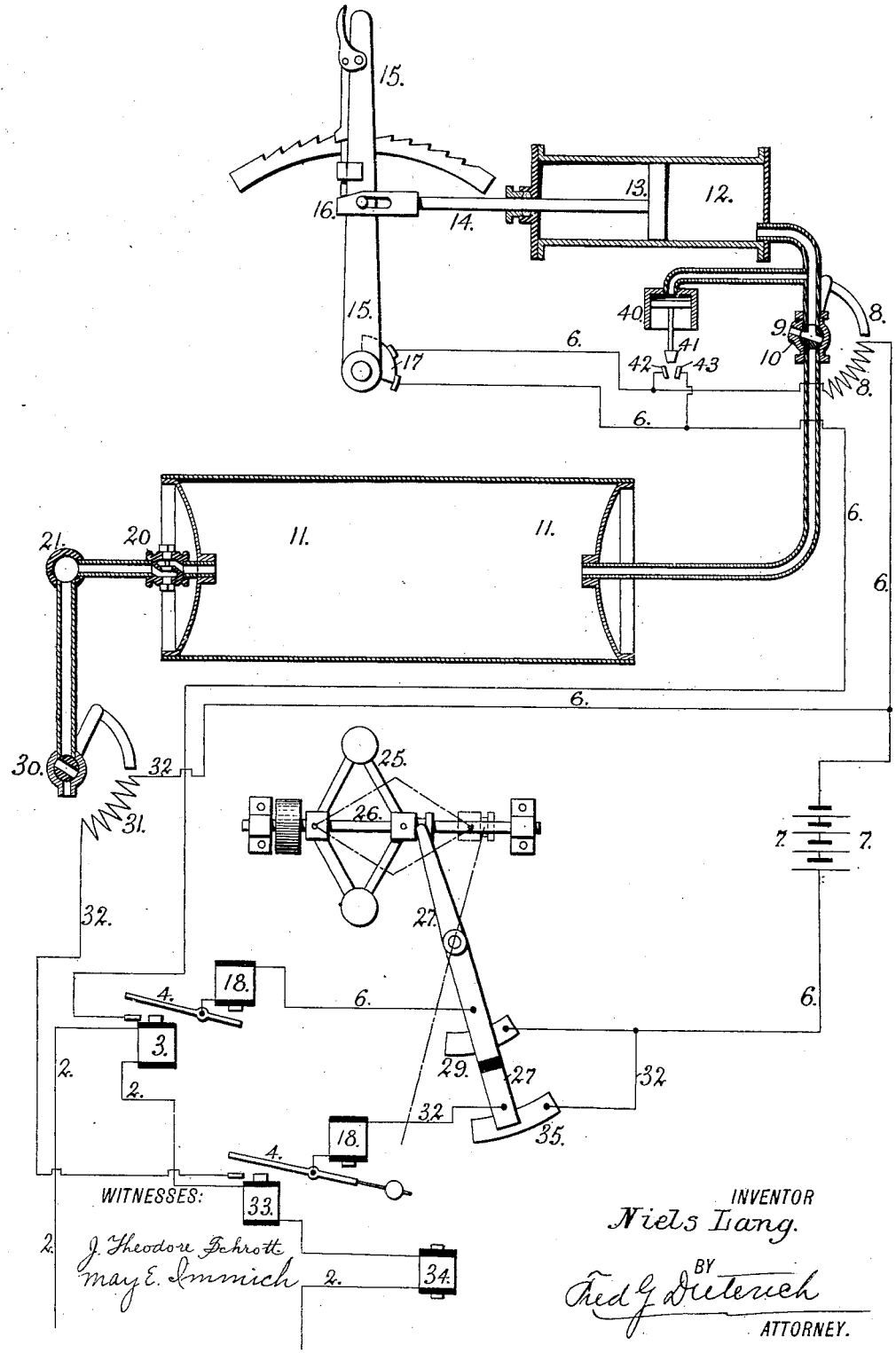
INVENTOR
Niels Lang.
BY
Fred J. Dieterich
ATTORNEY.

UNITED STATES PATENT OFFICE.

NIELS LANG, OF VANCOUVER, BRITISH COLUMBIA, CANADA.

AUTOMATIC TRAIN-CONTROLLING MECHANISM.

982,611.   Specification of Letters Patent.   Patented Jan. 24, 1911.

Application filed March 16, 1909. Serial No. 483,829.

*To all whom it may concern:*

Be it known that I, NIELS LANG, a citizen of the Dominion of Canada, residing at the city of Vancouver, in the Province of British Columbia, Canada, have invented a new and useful Automatic Train-Controlling Mechanism, of which the following is a specification.

This invention relates to a means for shutting off the steam from a locomotive engine and for applying the air brake when the engine passes onto a protected section of track, and is applicable to any system of signaling wherein a current from a track circuit is passed through an indicating circuit on the engine when that engine passes onto a section of track so protected. This indicating current may be turned into the track circuit either by the operation of placing the protecting "distant" and "home" signals at danger, or the current may be automatically turned into the track by a signaling system such as is set forth in Patent No. 904971 granted to me on the 24th November 1908 and amplified in two applications for patents filed by me on the 25th January 1909 under Serial Numbers 474065 and 474066 respectively in which systems when an engine enters upon a section of track which is already occupied by an engine or train or when it approaches an open or injured bridge an electric current is delivered into a track circuit and will pass through a circuit on the engine and indicates to the driver that he must check his speed or stop according to the strength of the current.

In the invention which is the subject of this application the indicating current there referred to is made use of to operate a mechanism whereby the steam is automatically cut off from the engine when the engine receives the cautionary current, indicating that a train occupies the section of track in advance, or is approaching a "distant" signal at danger; and when a stronger current passes through the indicating circuit of the engine, as when the engine approaches a "home" signal at danger, if the engine has not been brought to rest or is not at least under absolute control, the air brake is automatically applied.

The invention is particularly described in the following specification reference being made to the drawing by which it is accompanied which represents in a more or less diagrammatic manner, the means by which the passage of a current through the indicating circuit of the engine operates a mechanism connected therewith by which the throttle valve is closed and if necessary the air brake applied.

In this drawing 2 represents a portion of the circuit on the engine through which a current from the track circuit passes when the engine enters upon a protected section of track. In this indicating circuit 2 are shown three electro-magnets 3, 33 and 34 such as are referred to in the pending application filed under Serial Number 474066 as for indicating and recording the strength of the current in the track circuit and which strength will intimate to the driver whether there is occasion for caution or immediate danger ahead or in other words whether the distant or the home signal is at danger. Two only of these electro-magnets 3 and 33 are made use of in this invention namely those which are adjusted to indicate the cautionary and the emergency indicating current representing say the "distant" and the "home" signal, 3 being for the "distant" and 33 for the "home", the armature of the latter being counterweighted that it will be attracted to its magnet only by the greater strength of current. The armature 4 of this magnet 3 is designed to close a circuit 6 on the engine in which is a battery 7 by which the operating mechanism to be described later is actuated. As the current through the indicating circuit 2 is only transitory as the engine passes over the insulated rail by which connection is made to the track circuit, a holding electro-magnet 18 is introduced in the circuit 6 that will when sensitized act on the armature 4 of electro-magnet 3 and will hold the circuit 6 closed until the speed of the engine is reduced or the circuit otherwise broken. In this battery circuit 6 is a solenoid 8 which when the coil is sensitized will operate to open a stop cock 10 to admit compressed air or other fluid under pressure to a cylinder 12 in which is a piston 13 connected by means of its rod 14 to the throttle lever 15 by which the admission of steam to the engine cylinders is controlled.

When the throttle valve lever is provided with a ratchet and detent to retain the lever in any position in which it may be set the cross head of the piston rod 14 is provided with an elongated slot where it connects to the pin on the lever, and means is provided that the earliest part of the piston outward stroke will lift the ratchet detent that the lever 15 may be moved. This provision is shown in the drawing as consisting of a wedge portion 16 at the end of the cross head, which wedge portion engages a downward prolongation from the detent so that in moving the length of the slot the wedge portion will first engage and lift the detent.

Compressed air to operate in the cylinder 12 may be charged into a reservoir 11 through a check valve 20 from the air brake pipe 21, the check valve being provided to prevent a reduction of pressure in the train pipe from influencing the pressure in the reservoir 11.

As the driver may have shut off the steam from his engine before the automatic device is brought into action, and it is not desirable in such an instance for the fluid pressure to be admitted to the cylinder 12, means is provided whereby the circuit 6 cannot be closed unless the throttle valve lever 15 is in an opened position. In the drawing this result is shown as attained by a contact 17 on the lever 15 which contacts connect terminals of the circuit 6 only when the lever 15 is in any open position; so that if the driver has closed the throttle the circuit 6 is broken and the automatic mechanism cannot act either to admit air into the cylinder 12 or to apply the brakes by means of the stop cock. When the circuit 6 is broken the solenoid 8 will be de-sensitized and the stop cock 10 will by means of a spring not shown in the drawing move to the position indicated in the drawing cutting off air from the cylinder 12 and admitting any air that may be in the cylinder to exhaust through the aperture 9 of the stop-cock.

The introduction of the contact 17 to prevent the automatic mechanism from coming into play when the driver has himself closed the throttle will also have the effect of breaking the circuit 6 when the automatic mechanism has so acted so that as soon as the throttle lever is moved to the closed position the actuating means would be released. To prevent this action which would be objectionable in that after the automatic mechanism has shut off the steam the air would be exhausted from the cylinder 12 and the driver would be free to again open the throttle. This is guarded against by providing a small cylinder 40 which is connected to the acting end of the cylinder 12 or to the air pipe between the valve 10 and the cylinder. In this cylinder 40 is a piston carrying at its outer end a contact 41 which when the piston is pressed out when air is admitted establishes a connection between two terminals 42 and 43 of the circuit 6: so that if the lever 15 has been automatically moved to the closed position the piston 40 is simultaneously pressed out and connects the circuit 6 at that point and the circuit is not broken by the automatic action.

It is a requirement in any automatic device of this kind that when the speed of the engine has been reduced so that it is under perfect control, say to five miles an hour, the driver shall have the power to move at a speed not exceeding that within the protection of the signal guarding the section. To enable this to be done the circuit 6 is controlled by a centrifugal governor 25 the spindle 26 of which is driven in any approved manner from an unbraked pair of wheels of the engine, and to this governor is connected a pivotally mounted contact lever 27 to which the circuit 6 is connected and this contact lever travels when the speed of the engine is in excess of five miles an hour over a contact arc 29 to which the circuit 6 is also connected. These connections are made in such a manner that when the contact lever 27 is on the contact arc 29 the circuit 6 is closed, but when the speed of the engine falls below five miles an hour the governor will carry the contact lever off the contact arc 29 and the circuit 6 will be broken.

As the shutting off of the steam and the application of the brakes should be separably operable, the former by the cautionary current delivered through the indicating circuit 2 when the engine passes a distant signal at danger and acting on the indicating magnet 3 and the other by the emergency current which acts upon the electromagnet 33, these magnets must be provided with separate means for closing the operating battery circuit 6 and should not interfere one with the other. The air release to apply the brake is actuated by a coil 31 which is connected to the battery in a circuit 32 and acts upon a release valve 30 which when the coil 31 is sensitized opens to release air from the brake train pipe 21. The closing armature 4 of the electro-magnet 33 is maintained in a closed position as before by an electro-magnet 18 in the circuit and is connected to the battery through an extension of the governor contact arm 27 acting upon a contact arc 35, so that the action of the governor 25 may control this automatic brake application as it does that of the throttle valve, but the length of the contact arc 35 should be shorter, that the governor will open or close the brake operating circuit at a higher speed than that of the throttle lever control. This will insure that on moving within the protection of a signal if the required speed is exceeded the throttle operating circuit 6 will be closed before that of the air brake.

A means is thus provided whereby the speed of a locomotive engine will be automatically checked when it enters upon a section of track that is protected by a danger signal or stopped altogether when approaching a home signal at danger so long as those signals are connected with an indicating system by which a current is turned into an indicating circuit on the engine such as is exemplified in the patent applications before referred to and this control does not interfere with the freedom of action of the driver to himself check the speed of his engine, nor does it come into play when the driver attends to his duty in this respect.

The system though somewhat elaborate to describe and illustrate is exceedingly simple in its practical detail and is neither expensive to apply nor subject to derangement.

Having now particularly described my invention and the manner of its operation I hereby declare that what I claim as new and desire to be protected in by Letters Patent is;

1. In a train stopping and controlling mechanism, a throttle valve and lever for controlling the steam to the engine, a cylinder, and piston connections between said piston and said throttle lever for moving said throttle lever to its closed position, an air reservoir, pipe connections between said reservoir and said cylinder, a valve in said pipe connections normally closing the passage of air to said cylinders, a main partial circuit including a relay, electromagnetic devices for opening said air valve, a local circuit including a source of electromagnetic energy and controlled by said relays for energizing said electromagnetic devices when said relay is operated, said relay including a relay magnet and its armature, and an auxiliary magnet in said local circuit to hold said armature in its closed position independently of said relay magnet.

2. In a train stopping and controlling system, the combination with the engineer's throttle valve, of a cylinder and piston cooperatively connected with the throttle valve lever to open said throttle valve, an air reservoir, and pipe connections between said air reservoir and said cylinder, a normally closed air valve in said pipe connections, electromagnetic devices for opening said air valve, a main partial circuit, a relay having its magnet connected in said partial circuit to close the contacts of said relay when said magnet is energized, a local circuit including said relay contacts, and said electromagnetic valve operating devices to connect said cylinder and air reservoir when said relay magnet closes the relay contacts, and means for opening said local circuit when the speed of the train drops below a predetermined amount.

3. In a train stopping and controlling system the combination with the engineer's throttle valve, of a cylinder and piston operatively connected with the throttle valve lever to open said throttle valve, an air reservoir, and pipe connections between said air reservoir and said cylinder, a normally closed air valve in said pipe connections, electromagnetic devices for opening said air valve, a main partial circuit, a relay having its magnet connected in said partial circuit to close the contacts of said relay when said magnet is energized, a local circuit including said relay contacts, and said electromagnetic valve operating devices to connect said cylinder and air reservoir when said relay magnet closes the relay contacts, a switch in said local circuit controlled by said throttle valve lever to open said local circuit when the throttle valve is open, and an auxiliary switch in said local circuit for closing said local circuit independently of said throttle lever switch.

4. In a train stopping and controlling system, the combination with the engineer's throttle valve, of a cylinder and piston operatively connected with the throttle valve lever to open said throttle valve, an air reservoir, and pipe connections between said air reservoir and said cylinder, a normally closed air valve in said pipe connections, electromagnetic devices for opening said air valve, a main partial circuit, a relay having its magnet connected in said partial circuit to close the contacts of said relay when said magnet is energized, a local circuit including said relay contacts, and said electromagnetic valve operating devices to connect said cylinder and air reservoir when said relay magnet closes the relay contacts, a switch in said local circuit controlled by said throttle valve lever to open said local circuit when the throttle valve is open, an auxiliary switch in said local circuit for closing said local circuit independently of said throttle lever switch, and air operated devices for said auxiliary switch to close the same when said air valve is open to connect said air reservoir with said cylinder.

5. In a train stopping and controlling system, the combination with the engineer's throttle valve, of a cylinder and piston operatively connected with the throttle valve lever to open said throttle valve, an air reservoir, and pipe connections between said air reservoir and said cylinder, a normally closed air valve in said pipe connections, electromagnetic devices for opening said air valve, a main partial circuit, a relay having its magnet connected in said partial circuit to close the contacts of said relay when said magnet is energized, a local circuit including said relay contacts, and said electromagnetic valve operating devices to connect said cylinder and air reservoir when said relay magnet closes the relay contacts, a switch in said local circuit controlled by said throttle valve lever to open said local circuit when the throttle valve is open, and an auxiliary switch in said local circuit for closing said local circuit independently of said throttle lever switch, and a speed controlled switch in said local circuit to break said local circuit when the speed of the train is below a predetermined amount.

6. In a train stopping and controlling system, the combination with the engineer's throttle valve, of a cylinder and piston operatively connected with the throttle valve lever to open said throttle valve, an air reservoir, and pipe connections between said air reservoir and said cylinder, a normally closed air valve in said pipe connections, electromagnetic devices for opening said air valve, a main partial circuit, a relay having its magnet connected in said partial circuit to close the contacts of said relay when said magnet is energized, a local circuit including said relay contacts, and said electromagnetic valve operating devices to connect said cylinder and air reservoir when said relay magnet closes the relay contacts, a switch in said local circuit controlled by said throttle valve lever to open said local circuit when the throttle valve is open, an auxiliary switch in said local circuit for closing said local circuit independently of said throttle lever switch, and air operated devices for said auxiliary switch to close the same when said air valve is open to connect said air reservoir with said cylinder, and a speed controlled switch in said local circuit to break said local circuit when the speed of the train is below a predetermined amount.

7. In a train stopping and controlling system a partial circuit including a relay having its magnet connected in said circuit, an air valve, electromagnetic devices for operating said air valve, a local circuit including said electromagnetic devices, and the contacts of said relay, and an auxiliary holding magnet in said local circuit to retain the relay contacts closed.

8. In a train stopping and controlling system, a partial circuit including a relay having its magnet connected in said circuit, an air valve, electromagnetic devices for operating said air valve, a local circuit including said electromagnetic devices, and the contacts of said relay, an auxiliary holding magnet in said local circuit to retain the relay contacts closed, and a speed controlled switch also in said local circuit to open said local circuit when the speed of the train drops below a predetermined amount.

9. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir to said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relay, said relays operating under different conditions to successively close the respective local circuits.

10. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir to said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relay, said relays operating under different conditions to successively close the respective local circuits, and a speed controlled mechanism in said local circuits to open the same when the train is running below a predetermined speed.

11. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir and said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relay, said relays operating under different conditions to successively close the respective local circuits, and auxiliary holding magnets for each relay connected in the respective local circuits.

12. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir and said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relay, said relays operating under different conditions to successively close the respective local circuits, a speed controlled mechanism in said local circuits to open the same when the train is running below a predetermined speed, and auxiliary holding magnets for each relay connected in the respective local circuits.

13. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir and said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relay, said relays operating under different conditions to successively close the respective local circuits, a switch in said first mentioned local circuit, and means connected with the lever of said throttle valve for operating said switch to open the respective local circuit when said throttle valve is closed.

14. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir and said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relay, said relays operating under different conditions to successively close the respective local circuits, a speed controlled mechanism in said local circuits to open the same when the train is running below a predetermined speed, a switch in said first mentioned local circuit, and means connected with the lever of said throttle valve for operating said switch to open the respective local circuit when such throttle valve is closed.

15. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir and said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relays, said relays operating under different conditions to successively close the respective local circuits, auxiliary holding magnets for each relay connected in the respective local circuits, a switch in said first mentioned local circuit, and means connected with the lever of said throttle valve for operating the said switch to open the respective local circuit when said throttle valve is closed.

16. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir and said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relays, said relays operating under different conditions to successively close the respective local circuits, a speed controlled mechanism in said local circuits to open the same when the train is running below a predetermined speed, auxiliary holding magnets for each relay connected in the respective local circuits, a switch in said first mentioned local circuit, and means connected with the lever of said throttle valve for operating the said switch to open the respective local circuit when such throttle valve is closed.

17. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir and said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relay, said relays operating under different conditions to successively close the respective local circuits, a switch in said first mentioned local circuit, means connected with the lever in said throttle valve for operating said switch to open the respective local circuit when said throttle valve is closed, and an auxiliary-air operated switch in said first mentioned local circuit to close the same independently of said throttle lever switch.

18. In a train stopping and controlling system, the combination with the engineer's throttle valve and the air brake system of a train, an air valve connected with the train pipe of the air brake system for setting the brakes, a cylinder and its piston connected with the throttle lever of said throttle valve to open said throttle valve, an air reservoir, pipe connections between said air reservoir and said cylinder, an air valve in said pipe connections normally closing the passage of air from said reservoir to said cylinder, a partial circuit including a plurality of relays, a local circuit including the contacts of one of said relays, electromagnetic devices for opening said air valve in said pipe connections, said electromagnetic devices included in said local circuit, electromagnetic devices for opening said air brake valve, a supplemental local circuit including said last named electromagnetic devices and the contacts of the other relays, said relays operating under different conditions to successively close the respective local circuits, a speed controlled mechanism in said local circuits to open the same when the train is running below a predetermined speed, auxiliary holding magnets for each relay connected under the respective local circuits, a switch in said first mentioned local circuit, means connected with the lever of said throttle valve for operating the said switch to open the respective local circuit when such throttle valve is closed, and an auxiliary air operated switch in said first mentioned local circuit to close the same independently of said throttle lever.

In testimony whereof I have signed my name to this specification in the presence of two subscribing witnesses.

NIELS LANG.

Signed in the presence of—
ROWLAND BRITTAIN,
A. G. WOOLSEY.